United States Patent [19]

Saraceno

[11] Patent Number: 4,606,562
[45] Date of Patent: Aug. 19, 1986

[54] JUNCTION BOX CONNECTOR

[75] Inventor: Anthony Saraceno, Brooklyn, N.Y.

[73] Assignee: Pristine Manufacturing Corp., Brooklyn, N.Y.

[21] Appl. No.: 674,416

[22] Filed: Nov. 23, 1984

[51] Int. Cl.⁴ .............................................. F16L 5/00
[52] U.S. Cl. ................................... 285/159; 285/161; 285/322; 174/65 R
[58] Field of Search ............... 285/158, 159, 161, 206, 285/207, 208, 341, 322, 323; 174/65 R

[56] References Cited

U.S. PATENT DOCUMENTS

| | | | |
|---|---|---|---|
| 1,030,237 | 6/1912 | Hall | 285/342 |
| 1,888,343 | 11/1932 | Bohlman et al. | 285/382.7 |
| 2,092,368 | 9/1937 | Douglas | 285/206 X |
| 2,100,796 | 11/1937 | Church | 285/161 X |
| 2,255,673 | 9/1941 | McDermott | 285/161 X |
| 2,454,767 | 11/1948 | Brushaber | 285/161 X |
| 2,749,148 | 6/1956 | Schneiderman | 285/161 X |

Primary Examiner—Dave W. Arola
Attorney, Agent, or Firm—Goodman & Teitelbaum

[57] ABSTRACT

A junction box connector for coupling a conduit to a junction box. The connector includes an externally threaded nipple with radially outwardly extending teeth at one end thereof. The teeth are twisted so as to have a forwardly directed leading edge. The nipple is inserted into an aperture of the junction box so that the teeth can abut against the inner walls of the junction box. A smooth internal bore having a shoulder portion therein is provided within the nipple for receiving the conduit which is inserted up to the shoulder portion. A compression ring and a compression cap are placed about the conduit with the ring being positioned within the cap. The cap is threaded onto the nipple to simultaneously lock the nipple to the junction box while compressing the compression ring between the free end of the nipple and the cap to thereby securely grasp the conduit. The cap is provided with a lip for engaging the compression ring.

7 Claims, 3 Drawing Figures

JUNCTION BOX CONNECTOR

BACKGROUND OF THE INVENTION

This invention relates to a coupling for connecting a conduit to a junction box.

Numerous types of couplers and connector assemblies are readily available for connecting conduits to junction boxes. Typically, such junction boxes are used in electrical connections where it is referred to as a connection box, an outlet box, or a junction box, and it contains a plurality of apertures through which are connected various types of conduits. The connectors typically include a nipple extending from the junction box, with the nipple having an internal bore for receiving the conduit. The nipple is secured onto the junction box, and an external nut threads onto the nipple and secures the conduit to the nipple.

One such type of connector is described in U.S. Pat. No. 1,030,237. In that patent, the nipple includes an internal flange. The nipple is inserted through the aperture of the electric junction box with the flange abutting the inside wall of the junction box. The nipple is secured to the junction box by means of an external lock nut. The conduit is then inserted into an internal bore in the nipple until the conduit abuts a shoulder provided within the bore. The conduit is externally scored and appropriate wedging metal is placed around the conduit. A cap member threads onto the nipple and forces the wedges into the scored portions of the conduit to secure the conduit in place.

While such connector can function adequately to retain the conduit in place, it requires a number of separate securing steps in order to effect the connection. Firstly, the nipple must be separately secured to the junction box, and subsequently, in a separate securing step, the conduit is secured to the nipple. Additionally, it requires the scoring on the exterior surface of the conduit and requires the utilization of the wedges.

Another common way of griping the conduit is through the use of a split compression ring. Such rings are described in U.S. Pat. Nos. 1,809,582 and 1,888,343. The compression ring typically has a substantially arcuate or V-shaped cross section. The compression ring is placed over a conduit and is sandwiched between a nipple and a compression cap whereby the compression ring is deformed forcing together the opposing side edges of the compression ring, thereby reducing the diameter of the compression ring and forcing it into a gripping engagement with the conduit.

In both of these latter arrangements although a compression ring is provided for the gripping of the conduit, the nipple extending from the junction box is either integrally formed with the junction box or separately retained in place by means of an internal or external locking nut. As a result, there is still needed two separate steps, one for securing the nipple to the junction box and the other to secure the conduit to the nipple.

Accordingly, there appears to be a need for an improved coupling arrangement which permits the coupling of the conduit to the junction box using a single tightening step without the need of a separate locking of the coupling to the junction box and a separate locking of the conduit to the coupling.

SUMMARY OF THE INVENTION

Accordingly, it is an object of the present invention to provide a connector assembly which avoids the aforementioned problems of prior art devices.

A further object of the present invention is to provide a connector arrangement for connecting a conduit to a junction box which includes a single locking member for simultaneously locking the conduit to the coupler and the coupler to the junction box.

Yet a further object of the present invention is to provide a coupling arrangement for connecting a conduit to a junction box whereby the conduit is held by means of a compression ring and the coupling arrangement is simultaneously secured to the junction box.

Another object of the present invention is to provide a coupling arrangement for connecting a conduit to a junction box whereby the coupling arrangement includes gripping teeth for biting into the inner wall of the junction box as an external locking nut tightens onto the coupling arrangement.

Briefly, in accordance with the present invention, there is provided a junction box connector for coupling a conduit to a junction box. The connector includes an externally threaded nipple having a radially extending flange portion at one end thereof. The nipple is inserted thorugh an aperture in the junction box so that the flange abuts against an inner wall of the junction box. A smooth internal bore is formed in the nipple which includes an inwardly directed shoulder portion. The conduit, which will be received in the internal bore, abuts against the shoulder portion to stop the insert of the conduit.

A compression ring is provided for placement around the conduit. An internally threaded compression cap, which also surrounds the conduit, threads onto the nipple to lock the nipple to the junction box while at the same time compressing the compression ring, disposed between a lip of the compression cap and the free end of the nipple, to thereby securely grasp the conduit. In this manner, the threading of the compression cap serves to both secure the connector to the junction box and also at the same time to lock the conduit in place.

In an embodiment of the present invention, the internal length of the compression cap is slightly less than the length measured from the exterior wall of the junction box until the end of the compression ring, but being greater than the threaded portion of the nipple. The radial flange of the nipple includes a plurality of teeth each having a forwardly directed, angularly twisted leading edge for biting into the interior wall of the junction box. In this manner, by threading the compression cap onto the nipple, as the rear edge of the compression cap abuts the exterior wall of the junction box, continued tightening of the compression cap onto the nipple will compress the compression ring to tightly grip the conduit, and at the same time will cause the flange teeth to bite into the inner wall of the junction box so as to sandwich the junction box between the flange teeth and the rear edge of the compression cap to thereby secure the nipple to the junction box.

The aforementioned object, features and advantages of the present invention, will, in part, be pointed out with particularity, and will, in part, become obvious from the following more detailed description of the invention, taken in conjunction with the accompanying drawing, which forms an integral part thereof.

BRIEF DESCRIPTION OF THE DRAWING

In the drawing.

In the various figures of the drawing, like reference characters designate like parts.

DESCRIPTION OF THE PREFERRED EMBODIMENT

Figure 1:
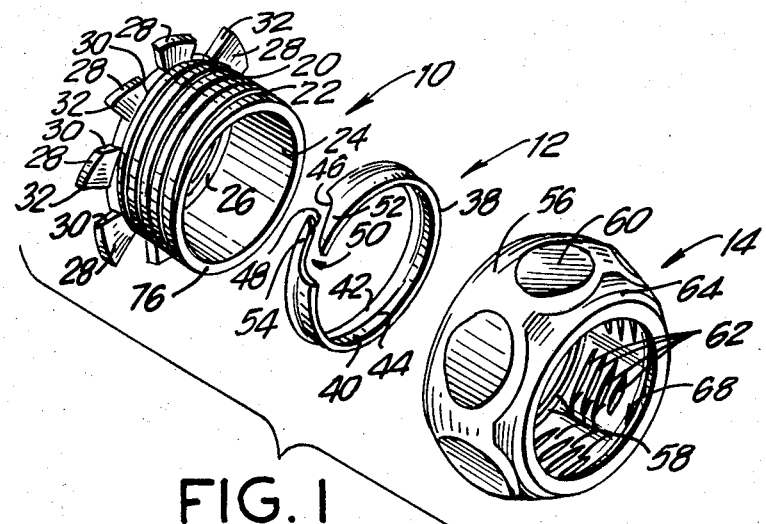
FIG. 1 is a perspective exploded view of the coupling arrangement in accordance with the present invention.

Referring now to the drawing, the connector assembly of the present invention comprises an externally threaded nipple member 10, a compression ring 12, and a compression cap 14. The connector assembly is utilized to interconnect a tubular conduit 16 to a junction box 18. The junction box 18 can typically be an electrical box, an outlet box, or any other type of connector box well known in the art. Additionally, not only can the present connector assembly be utilized for electrical connections, but it can also be used as standard pipe connection for plumbing, and the like.

The nipple member 10 comprises a substantially cylindrical body portion 20 having an external thread 22 formed along its entire length. The interior of the nipple member 10 includes a smooth bore 24 with a shoulder portion 26 adjacent the rear edge of the nipple member 10.

Figure 2:
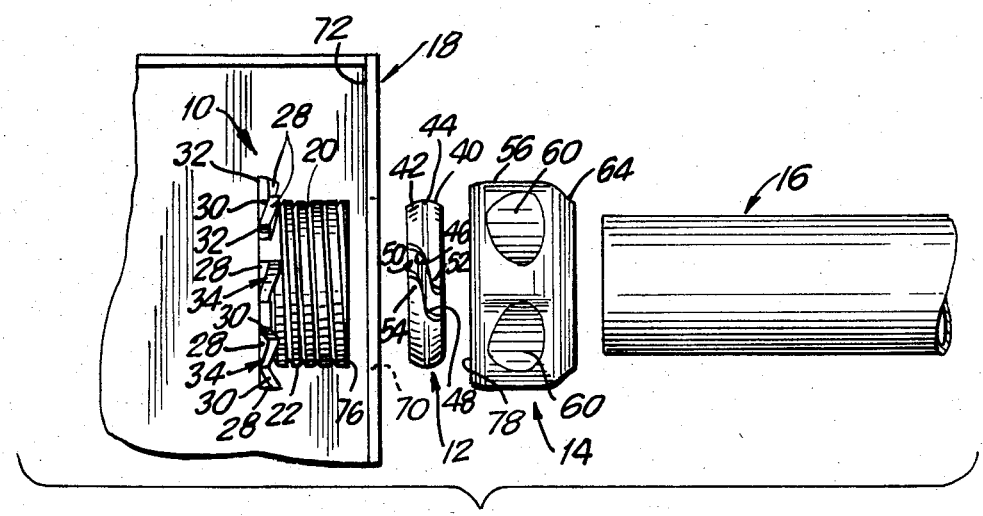
FIG. 2 is an exploded plan view of the coupling arrangement shown in FIG. 1 as it is being utilized to connect a conduit to a junction box.

At the rear of the nipple member 10, there is an outwardly directed flange formed of a plurality of individual radially extending tangs 28 which are uniformly spaced about the circumference of the nipple member 10. The tangs 28 are each trapezoidal in shape and are each inwardly twisted about their respective radial axes so as to have the forward edge 30 in a plane forward of the plane including the rear edge 32 of each tang 28. As best seen in FIG. 2, this twisting makes an inclined surface 34 with the vertical plane to form an angle of approximately 30 degrees.

Figure 3:
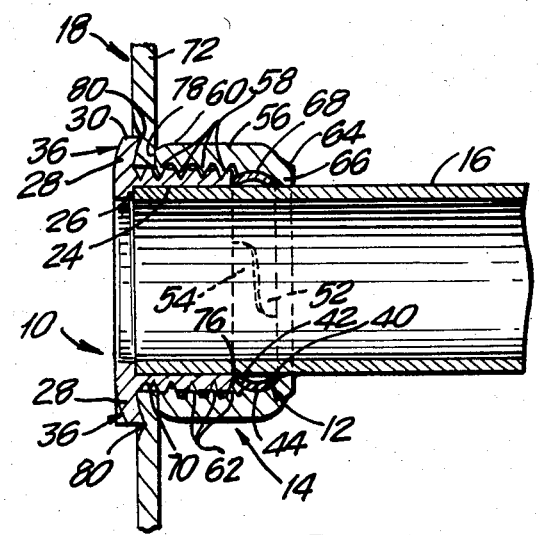
FIG. 3 is a sectional view taken through the assembled arrangement with the coupler secured to the junction box and the conduit tightly retained in place.

At the same time, the leading edge 30, is also forwardly bent with respect to the rear edge of the nipple member 10, as best seen in FIG. 3 so as to form an inclined surface 36 typically at an angle of approximately 20 degrees.

The compression ring 12 is a cylindrical thin walled member 38 having a substantially arcuated-shaped cross section to form opposing inwardly directed lateral sides 40, 42 with a center rib 44 therebetween. The compression ring 12 is split with the split being in the form of an S-cut. Accordingly, one edge of the split terminates in an S-shaped edge 46 and the opposing S-shaped edge is spaced therefrom to provide an S-shaped gap 50 therebetween. In this manner, there is provided a finger portion 52 on the side 40 and an adjacent finger portion 54 on the side 42 permitting the two finger portions to engage adjacent each other upon compression of the ring 12, as shown in FIG. 3, when the gap 50 is closed.

An important feature of the present invention is that the compression cap 14 is longitudinally longer in the axial direction than the nipple member 10, as set forth below. The compression cap 14 is essentially a cylindrical nut 56 having internal threads 58 formed along an internal portion thereof. External flats 60 are formed about the periphery thereof to permit the grasping of the nut 56 with a wrench or locking tool. Preferably, internal cuts 62 are provided along the internal periphery of the nut 56 in the underside of the flats 60 to provide the internal threads 58 between the cuts 62 at least along a forward portion thereof, where at least a few threads 58 are continuous about the internal portion at the rear portion thereof.

The forward edge of the cap 14 terminates in an inwardly directed tapered end 64 to provide a downwardly turned cylindrical lip 66 having a smaller diameter than the threads 58. Rearward of the lip 66 and forward of the cuts 62, and the internal threads 58 formed thereby, is a concave seat portion 68 which can receive the compression ring 12.

It is noted, that the internal diameter of the lip portion 66 is substantially identical to the internal diameter of the smooth bore 24 in the nipple member 10. Furthermore, these diameters proximate the exterior diameter of the conduit 16. As best seen in FIG. 3, the conduit 16 can therefore fit into the smooth bore of the nipple member 10 and the lip portion 66, and abut against the shoulder 26.

The interior diameter of the shoulder portion 26 substantially corresponds to the interior diameter of the conduit 16. In this manner, as shown in FIG. 3, there is provided a substantial continuity of the distal end of the conduit 16, where it terminates at the shoulder portion 26 to provide a continuous smooth interior. The shoulder portion 26 itself, is formed adjacent the rear end of the nipple member 10 so that the conduit 16 itself extends into the junction box and terminates approximately in alignment with the inner wall surface of the junction box 18.

In utilizing the coupling assembly of the present invention, the nipple member 10 is inserted through an aperture 70 formed in one wall 72 of the junction box 18, with the teeth 28 abutting against the inner surface of the wall 72.

The compression cap 14 is placed onto the distal end of the conduit 16 with the compression ring 12 being placed within the seat portion 68 of the cap 14. The distal end of the conduit 16 is then inserted into the smooth bore 24 of the nipple member 10 until it rests against the shoulder portion 26.

The compression cap 14 is then threaded onto the nipple member 10 which is projecting from the junction box wall 72. As the compression cap 14 is tightened, the compression ring 12 is compressed between the forward edge 76 of the nipple member 10 and the lip 66 while being retained in the seat portion 68.

The tightening of the compression cap 14 initially causes the split fingers 52, 54 to abut against each other, thereby reducing the diameter of the compression ring 12. Furthermore, the opposing sloped side walls 40, 42 are brought together by the tightening of the cap 14, thereby further reducing the diameter of the compression ring 12 and forcing it to clamp tightly and bite into the exterior surface of the conduit 16 so as to securely grasp the conduit 16 in place within the secured nipple member 10 and cap 14.

Simultaneously with the threading of the compression cap 14 onto the nipple member 10, the nipple member 10 itself will also be tightly secured in place on the junction box 18. The rear edge 78 of the compression cap 14 will continue to thread until it abuts against the exterior surface of the wall 72 of the junction box 18. Further tightening of the cap 14 will then force the teeth 28 of the nipple member 10 to bite into the interior surface of the wall 72 of the junction box 18 at points 80, as best shown in FIG. 3.

It will accordingly be appreciated that the single tightening of the compression cap 14 serves to simultaneously lock the coupling assembly in place relative to the junction box 18, and at the same time also grasps the conduit 16. There is no need for both a separate locking nut to secure the nipple member in place, and a separate member to lock the conduit in place. The same compression cap 14 simultaneously serves to lock the conduit 16, and at the same time secures the connector assembly to the junction box 18.

Accordingly, the internal length of the compression cap 14 from the lip portion 66 to the rear edge 78 is longer than the threaded body portion 20 of the nipple member 10, being slightly less than the distance from the exterior surface of the wall 72 to the end of the compression ring 12. In this manner, by the continued tightening of the compression cap 14, the compression ring 12 will be properly compressed to engage and secure the conduit 16. At the same time, the continued tightening also forces the teeth 28 of the nipple member 10 to bite into the interior surface of the wall 72 for securement thereto.

There has been disclosed heretofore the best embodiment of the invention presently contemplated. However, it is to be understood that various changes and modification may be made thereto without departing from the spirit of the present invention.

What is claimed is:

1. A junction box connector for coupling a conduit to a junction box, said connector comprising:
   a one-piece nipple having a radially outwardly extending flange disposed around one end of said one-piece nipple;
   said one-piece nipple having an externally threaded body portion extending from said flange to an opposite end of said one-piece nipple;
   said one-piece nipple having a predetemined size for permitting insertion of said body portion through an aperture in the junction box with said flange abutting against an inner wall of the junction box;
   an internal bore extending longitudinally through said one-piece nipple;
   a shoulder portion provided at said one end of said one-piece nipple, said shoulder portion extending from said flange into said bore;
   walls of said bore being smooth within said body portion from said shoulder portion to said opposite end of said one-piece nipple;
   said walls of said bore having a predetermined size for receiving the conduit when inserted into said opposite end of said one-piece nipple so that the conduit abuts against said shoulder portion;
   said flange including teeth means for biting into the inner wall of the junction box as the flange is tightened against the inner wall;
   said teeth means including a plurality of radially outwardly extending circumferentially spaced apart tangs, said tangs being twisted about their respective radial axes toward said body portion, and leading edges of said tangs being bent from respective rear edges toward said body portion so that said leading edges lie in a predetermined position over said body portion for biting into the inner wall of the junction box;
   a compression cap having an opening extending through said compression cap for receiving said body portion of said one-piece nipple;
   first walls of said opening being internally threaded commencing from one end of said compression cap and extending only partially along an interior length of said opening for threaded engagement on said body portion of said one-piece nipple;
   a radially directed lip provided at an opposite end of said compression cap, said lip extending into said opening;
   an arcuate seat portion provided in second walls of said opening between said threaded first walls and said lip;
   a compression ring having an arcuate cross section;
   said compression ring being received in said seat portion of said compression cap for placement around the conduit;
   said interior length of said opening of said compression cap from said one end of said compression cap to said lip being greater than longitudinal length of said threaded body portion of said one-piece nipple by an amount less than width of said compression ring so that when said compression cap is being securely threaded onto said body portion of said one-piece nipple which extends through the aperture in the junction box with the conduit therein, said opposite end of said one-piece nipple will compress said compression ring against said lip of said compression cap and force said compression ring into said seat portion so that said compression ring will be engaged against the conduit to secure the conduit within said compression cap, and simultaneously when said compression cap is disposed against an outer wall of the junction box, said leading edges of said tangs of said flange of said one-piece nipple will bite into the inner wall of the junction box to secure said one-piece nipple to the junction box, thus coupling the conduit to the junction box.

2. A junction box connector as in claim 1, wherein each tang is twisted approximately 30 degrees.

3. A junction box connector as in claim 2, wherein the leading edge of each tang is bent approximately 20 degrees from its rear edge.

4. A junction box connector as in claim 1, wherein said shoulder portion has a radial length which proximates a wall thickness of the conduit to thereby provide a smooth continuity between an interior of the conduit and an inner edge of said shoulder portion.

5. A junction box connector as in claim 1, wherein an interior diameter of said lip proximates an interior diameter of said bore to provide a smooth receiving mouth for the conduit.

6. A junction box connector as in claim 1, wherein said compression ring is a split ring.

7. A junction box connector as in claim 6, wherein said split ring terminates in complementary S-shaped edges to thereby define a pair of spaced apart adjacent fingers which approach each other upon compression of said split ring.

* * * * *